(12) United States Patent
Kiesel et al.

(10) Patent No.: US 12,537,545 B2
(45) Date of Patent: Jan. 27, 2026

(54) VARIABLE-RATE TRUE-TIME DELAY FILTER

(71) Applicant: Viasat, Inc., Carlsbad, CA (US)

(72) Inventors: Gregory N. Kiesel, Marietta, GA (US); Charles R. Gibson, Tucker, GA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 18/717,665

(22) PCT Filed: Dec. 8, 2022

(86) PCT No.: PCT/US2022/052326
§ 371 (c)(1),
(2) Date: Jun. 7, 2024

(87) PCT Pub. No.: WO2023/107654
PCT Pub. Date: Jun. 15, 2023

(65) Prior Publication Data
US 2024/0413843 A1    Dec. 12, 2024

Related U.S. Application Data (60) Provisional application No. 63/287,509, filed on Dec. 8, 2021.

(51) Int. Cl.
*H04B 1/00* (2006.01)
*H03H 11/26* (2006.01)
*H04B 7/06* (2006.01)

(52) U.S. Cl.
CPC ........... *H04B 1/0021* (2013.01); *H03H 11/26* (2013.01); *H04B 7/0617* (2013.01)

(58) Field of Classification Search
CPC .... H04B 1/0021; H04B 7/0617; H03H 11/26; H04L 1/0016
See application file for complete search history.

(56) References Cited

U.S. PATENT DOCUMENTS

| | | | |
|---|---|---|---|
| 5,549,111 A | * | 8/1996 | Wright ............... G01S 7/52047 600/443 |
| 2009/0231197 A1 | | 9/2009 | Richards |
| 2023/0006723 A1 | * | 1/2023 | Zhou .................. H04B 17/318 |

FOREIGN PATENT DOCUMENTS

WO    2017/153985    9/2017

OTHER PUBLICATIONS

Notification of Transmittal of the International Search Report and Written Opinion dated Mar. 29, 2023 in PCT International Patent Application No. PCT/US2022/052326.

(Continued)

*Primary Examiner* — Vineeta S Panwalkar
(74) *Attorney, Agent, or Firm* — Snell & Wilmer L.L.P.

(57) ABSTRACT

Systems, methods and devices are disclosed for a variable-rate true-time delay (VR-TTD) decimator for receiving an input data signal and providing an output decimated signal. The VR-TTD decimator may comprise: a VR-TTD decimator input for receiving the input data signal; and a VR-TTD decimator output for outputting the output decimated signal; a numerically controlled oscillator (NCO) for receiving a time delay control signal and a desired rate signal and for controlling coarse filtering, fine filtering and decimation of the input data signal; and an accumulator for generating the output decimated signal, wherein the accumulator comprises a plurality of shift registers, controlled by the NCO. The system may comprise a beamformer for providing an output signal coherently summed from a plurality of paths, where each path comprises a VR-TTD decimator for providing VR-TTD to the respective signals of the plurality of paths.

19 Claims, 5 Drawing Sheets

(56) References Cited

OTHER PUBLICATIONS

Written Opinion dated Nov. 13, 2023 in PCT International Patent Application No. PCT/US2022/052326.
International Preliminary Report on Patentability dated Mar. 18, 2024 in PCT International Patent Application No. PCT/US2022/052326.
Paulsen et al., "IMPACT—A Low Cost, Reconfigurable, Digital Beamforming Common Module Building Block for Next Generation Phased Arrays", Open Architecture/Open Business Model Net-Centric Systems and Defense Transformation, pp. 947906-947906 (2015).
Jang et al., "A True Time Delay 16-Element 4-Beam Digital Beamformer", IEEE Radio Frequency Integrated Circuits Symposium, pp. 12-15 (2018).
Li et al., "An Area-Efficient Multi-Rate Digital Decimator", College of Electronic and Information Engineering Tongji University (2019).

\* cited by examiner

VARIABLE-RATE TRUE-TIME DELAY FILTER

CROSS-REFERENCE TO RELATED APPLICATION

This Application is a U.S. national stage entry under 35 U.S.C. § 371 of International Application No. PCT/US2022/052326 filed Dec. 8, 2022, entitled "VARIABLE-RATE TRUE-TIME DELAY FILTER", which claims priority to, and the benefit of, U.S. Provisional Application Ser. No. 63/287,509 filed on Dec. 8, 2021, entitled, "VARIABLE-RATE TRUE-TIME DELAY FILTER". The foregoing application is hereby incorporated by reference in its entirety (except for any subject matter disclaimers or disavowals, and except to the extent of any conflict with the disclosure of the present application, in which case the disclosure of the present application shall control).

TECHNICAL FIELD

The disclosure relates generally to the field of wireless communications, and more particularly to a variable-rate true-time delay filter and applications thereof.

BACKGROUND

True-time delay filters are useful, for example, in beamforming arrays that have a broad bandwidth of operation and many elements in the array. Under the circumstances where the bandwidth is small and the number of elements in the array is small, it is possible to use phase shifters in these true-time delay filters. The phase shifter embodiments are practical and relatively inexpensive. However, phase shifters can create beam squints, where the beam will point in a different direction depending on the frequency. Thus, improved filters for broadband/many-element beamforming arrays would be desirable.

SUMMARY

In an example embodiment, a system is disclosed. The system comprises: a beamformer for providing an output signal and a plurality of paths. The plurality of paths comprises at least a first path and a second path. The first path is configured to receive a first input signal from a first antenna element of an array of antenna elements, and the second path is configured to receive a second input signal from a second antenna element of the array of antenna elements, where the array of antenna elements configured to receive an RF signal from a remote source. In this example embodiment, the first path comprises: a first I/Q converter for receiving the first input signal and outputting a first I signal and first Q signal; and a first variable-rate true-time delay (VR-TTD) decimator for outputting a first decimated I signal and first decimated Q signal based respectively on the first I signal and the first Q signal. In this example embodiment, the second path comprises: a second I/Q converter for receiving the second input signal and outputting a second I signal and second Q signal; and a second VR-TTD decimator for outputting a second decimated I signal and second decimated Q signal based respectively on the second I signal and the second Q signal. The beamformer may be configured to receive and to sum the first decimated I signal and the second decimated I signal to output a beamformer I signal. The beamformer may be configured to receive and to sum the first decimated Q signal and the second decimated Q signal to output a beamformer Q signal; and the output signal may comprise the beamformer I signal and the beamformer Q signal.

In an example embodiment, a variable-rate true-time delay (VR-TTD) decimator for receiving an input data signal and providing an output decimated signal is disclosed. In this example embodiment, the VR-TTD decimator comprises: a VR-TTD decimator input for receiving the input data signal; and a VR-TTD decimator output for outputting the output decimated signal; a numerically controlled oscillator (NCO) for receiving a time delay control signal and a desired rate signal and for controlling coarse filtering, fine filtering and decimation of the input data signal; and an accumulator for generating the output decimated signal, wherein the accumulator comprises a plurality of shift registers, controlled by the NCO.

In an example embodiment, a method for providing variable-rate true-time delay (VR-TTD) filtering is disclosed comprising: receiving an input data signal; receiving a time delay control signal and a desired rate signal at a numerically controlled oscillator (NCO); generating, at the NCO, an output sample time signal, a coarse delay signal, and an output sample enable signal; and accumulating, at an accumulator, a decimator output signal, wherein the decimator output signal includes fine delay, coarse delay and filtering of the input data signal, based on the output sample time signal, the coarse delay signal, and the output sample enable signal from the NCO.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION

While exemplary embodiments are described herein in sufficient detail to enable those skilled in the art to practice the invention, it should be understood that other embodiments may be realized and that logical electrical and mechanical changes may be made without departing from the spirit and scope of the invention. Thus, the following detailed description is presented for purposes of illustration only.

Figure 1:
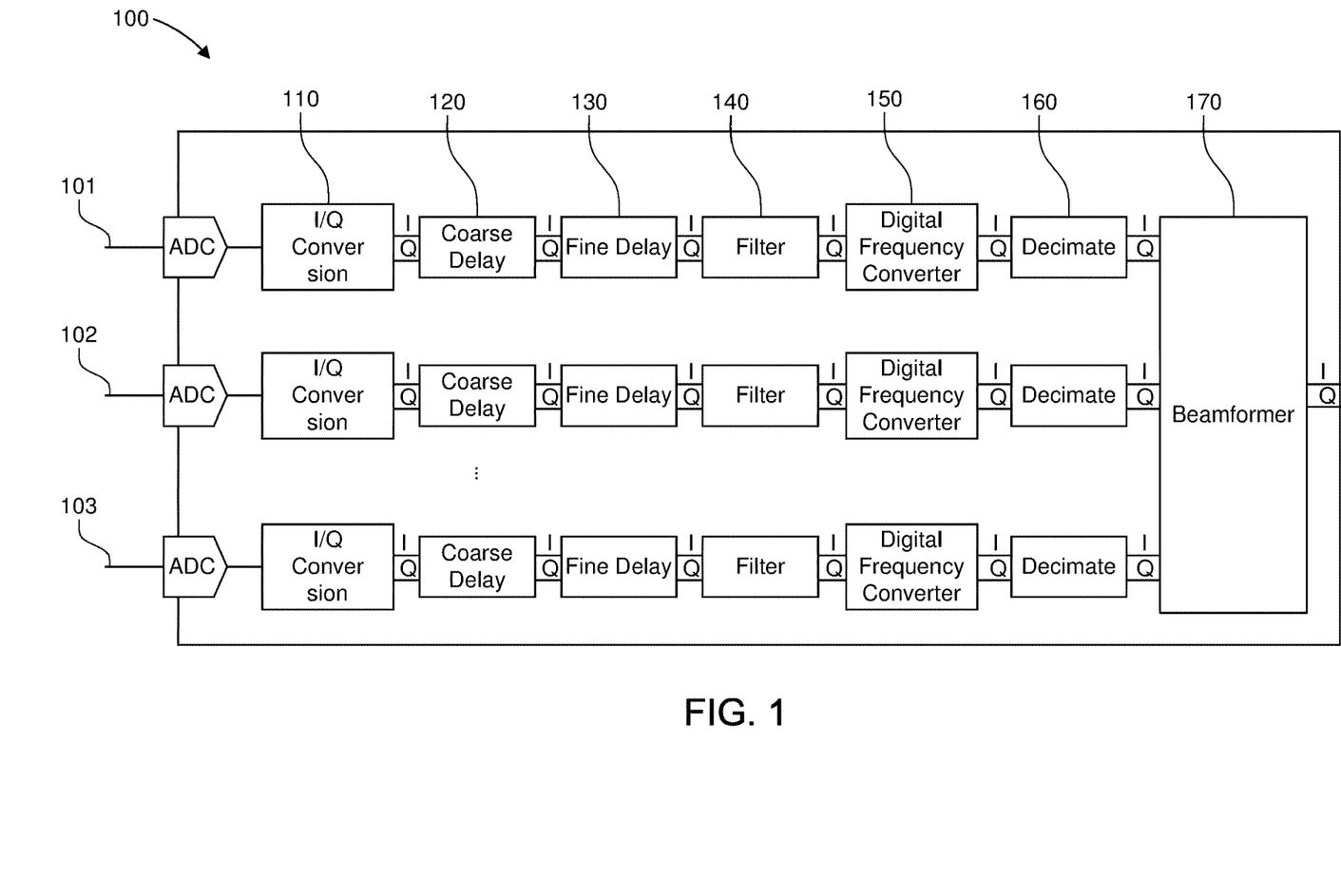
FIG. 1 illustrates a beamforming system.

With reference to FIG. 1, a system 100 implementing true-time delay comprises a plurality of signal paths 101, 102, 103, etc. Each signal path (101, 102, 103) is associated with a respective antenna element of an array of antenna elements. The antenna elements may receive an RF signal from a remote transmitter (source). The RF signal received from the remote source at each antenna element may have different delays arising from the geometry between the source and the antenna. Thus, each signal path is configured to compensate for these geometry-induced propagation effects so that the beamformer 170 can sum all the paths coherently. In some cases, each signal path is also configured to compensate for errors or other conditions that may be specific to that signal path and/or the corresponding antenna element.

Each of the plurality of signal paths comprises an I/Q converter 110 for generating an in-phase (I) signal and a quadrature (Q) signal, a coarse delay 120 for applying a coarse phase delay to one or both the I and Q signals, a fine delay 130 for applying a fine phase delay (e.g., a smaller quantity delay as compared to the coarse phase delay) to one or both the I and Q signals from the coarse delay component, a filter 140 for (among other functions) providing anti-alias filtering, interface suppression, or other operations, a digital frequency converter 150 and a decimate element 160. In an example embodiment, the digital frequency converter 150 is configured to select a specific band of frequencies to pass through the decimate element 160. The digital frequency converter 150 may perform frequency tuning to align the signals of interest and the passband of the decimator. The decimate element may be configured to reduce the sample rate of the input signal (e.g., the I and Q signals of the input signal). In accordance with various embodiments, the combination of the digital frequency converter 150 and the decimate element 160 facilitates a user selecting a variable-width band of frequencies centered anywhere in the system's spectrum for output. The I/Q converter 110, coarse delay 120, fine delay 130, filter 140, and/or digital frequency converter 150 may be arranged in any suitable order, and are not limited to the order shown in FIG. 1.

In some embodiments, the signal paths 101, 102, 103 may not split the respective input signals into separate I and Q signals and may instead operate on the input signals. The system 100 may further comprise a beamformer 170 for receiving and coherently combining signals from each decimate element 160 of each of the plurality of signal paths. When the number of signal paths is small, the number of such elements (120, 130, 140) in the system 100 is typically manageable. But when many array elements (each corresponding to one of the signal paths) are present, the number of elements is a multiple of the number of elements in each path and the number of paths, and thus the system becomes prohibitively expensive, large and inefficient. Moreover, the system 100 is susceptible to unacceptably large transients arising, for example due to changes when tracking relative movement between a source and the array of antenna elements (e.g., a source comprising a satellite). These transients can be greatly reduced using a variable-rate true-time delay decimator (VR-TTD) described further herein.

Figure 2:
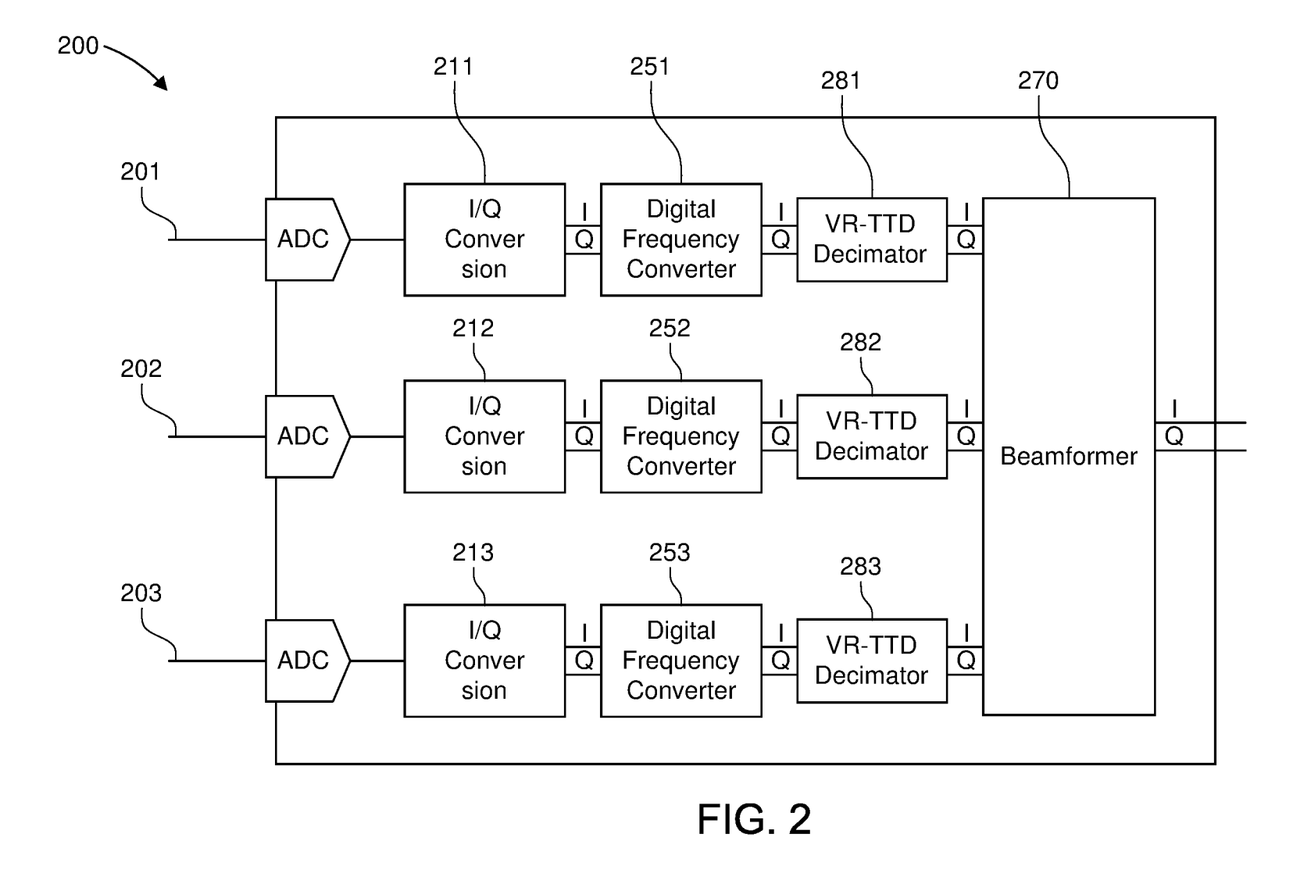
FIG. 2 illustrates a beamforming system, in accordance with example embodiments.

With reference now to FIG. 2, in an example embodiment, a system 200 comprises: a plurality of paths, comprising at least a first path 201 and a second path 202; and a beamformer 270. The system 200 may further comprise an Nth path 203. In an example embodiment, each path (1 through N) is associated with a respective antenna element, of an array of antenna elements. The array of antenna elements may receive an RF input signal from a transmitting source, such that each path may receive a signal from the respective antenna element. In an example embodiment, the first path 201 is configured to receive a first input signal from a first antenna element, the second path 202 is configured to receive a second input signal from a second antenna element, and an Nth path 203 is configured to receive an Nth input signal from an Nth antenna element. The first, second, and Nth input signals may each be converted from analog to digital via an analog-to-digital converter associated with each respective path.

Each path 201, 202, 203 may receive an input signal with a different time delay (due, for example, to the relationship between the location of the transmitting source, beam steering, the geometry of the antenna elements, and the like). In accordance with various example embodiments, it may be desirable, within each path to adjust a true-time delay of the signal through these N paths, such that all the signal paths can be combined in beamformer 270 in a coherent manner. In another example embodiment, each path is configured to perform compensation, for example, based on calibration of the antenna elements.

In an example embodiment, the first path 201 comprises: a first I/Q converter 211, a first digital frequency converter 251, and a first variable-rate true-time delay (VR-TTD) decimator 281. In an example embodiment, the second path 202 comprises: a second I/Q converter 212, a second digital frequency converter 252, and a second VR-TTD decimator 282. In an example embodiment, the Nth path 203 comprises: an Nth I/Q converter 213, an Nth digital frequency converter 253, and an Nth VR-TTD decimator 283. Furthermore, each path 1 through N may comprise its own I/Q converter, digital frequency converter, and VR-TTD decimator. In an example embodiment, the first path 201, the second path 202, and any additional paths up to an Nth path 203, are configured to respectively provide variable-rate true-time delay filtering of a digital input signal (i.e., an output of the respective ADC) of each path. Moreover, each path 1 through N may receive the respective digital input signal and provide variable-rate true-time delay filtering of the digital input signal. In other example embodiments, one or more of the I/Q converter (211, 212, 213) and the digital frequency converter (251, 252, 253) is optional. In example embodiments that do not comprise the I/Q converter (211, 212, 213), the processing described below with respect to FIGS. 2, 3A, and 3B may be performed on the digital input signal without separation into I and Q components.

In an example embodiment, the first I/Q converter 211 is configured to receive the first digital input signal and output a first I signal and a first Q signal. The first I signal and the first Q signal are orthogonal to each other. Similarly, the second I/Q converter 212 is configured to receive the second digital input signal and output a second I signal and a second Q signal, wherein the second I signal and the second Q signal are orthogonal to each other. The Nth I/Q converter 213 is configured to receive the Nth digital input signal and output an Nth I signal and an Nth Q signal, wherein the Nth I signal and the Nth Q signal are orthogonal to each other.

In an example embodiment where each path includes the respective I/Q converter (211, 212, 213) and the respective digital frequency converter (251, 252, 253), the first digital frequency converter 251 is configured to receive the first I signal and the first Q signal from the first I/Q converter 211 and output a first digital I signal and first digital Q signal. Similarly, the second digital frequency converter 252 is configured to receive the second I signal and the second Q signal, directly from the second I/Q converter 212, and to output a second digital I signal and second digital Q signal, and the Nth digital frequency converter 253 is configured to receive the Nth I signal and the Nth Q signal, directly from the Nth I/Q converter 213, and to output a Nth digital I signal and Nth digital Q signal. The digital frequency converter (251, 252, 253) may perform frequency shifting of the respective digital I/Q signals to align the frequency content of the respective signals with the passband of the decimator. The digital frequency converter (251, 252, 253) may determine the 'center' of an output frequency band of an output signal of the VR-TTD decimator (281, 282, 283).

In an example embodiment, the first VR-TTD decimator 281 is configured to receive the first digital I signal and first digital Q signal and to output a first decimated I signal and first decimated Q signal as its output signal. Similarly, the second VR-TTD decimator 282 is configured to receive the second digital I signal and second digital Q signal and to output a second decimated I signal and second decimated Q signal. The Nth VR-TTD decimator 283 is configured to receive the Nth digital I signal and Nth digital Q signal and to output an Nth decimated I signal and an Nth decimated Q signal. In an example embodiment, the first VR-TTD decimator 281, second VR-TTD decimator 282, and Nth VR-TTD decimator 283 are multi-rate decimation filters. In an example embodiment, the VR-TTD decimator (281, 282, 283) chooses the width of the output frequency band. As described in further detail herein, the VR-TTD decimators (281, 282, 283) are configured to provide variable-rate true-time delay filtering with coarse delay, fine delay and filtering integrated together.

In an example embodiment, the beamformer 270 is configured to receive the first decimated I signal, first decimated Q signal, second decimated I signal, second decimated Q signal, Nth decimated I signal, and Nth decimated Q signal. More generally, the beamformer 270 may be configured to receive N decimated I/Q signal pairs from N paths of the plurality of signal paths (e.g., 201, 202, . . . 203). In an example embodiment, the beamformer 270 is further configured to sum the N decimated I/Q signal pairs to form an output signal. In this example embodiment, the output signal comprises a beamformer I signal and a beamformer Q signal, wherein the beamformer I signal is based on the sum of the N decimated I signals, and wherein the beamformer Q signal is based on the sum of the N decimated Q signals. The VR-TTD decimators (281, 282, 283) work together to provide their output signals with appropriate delay adjustment so that the beamformer 270 can coherently combine the signals from each signal path (201, 202, 203).

Although the system 200 processes the signal in digital I/Q signals, in other example embodiments, the signal paths (201, 202, 203) of the system 200 may process a single (or combined without separate I/Q parts) signal from the respective analog-to-digital (ADC) converters. Such a system would similarly comprise multiple signal paths, with each path comprising a VR-TTD Decimator functioning similarly to that described herein.

As shown, the system 200 comprises fewer signal processing elements operating at intermediate frequency (e.g., a frequency to which the respective path input signal is shifted as an intermediate step) per path as compared to the system 100. In this regard, the system 200 may make significantly more efficient use of computing resources and real estate than the system 100. More specifically, the VR-TTD decimators 281, 282, 283 of the system 200 are configured to combine aspects of coarse time delay (e.g., delays on the order of hundreds of nanoseconds), fine time delay (e.g., delays on the order of picoseconds), and filtering (e.g., to enable decimation) that are done by separate individual components of the system 100 (e.g., the coarse delay, fine delay, and filter components of the system 100 that operate at respective intermediate frequencies). By integrating these functions into the single component of the VR-TTD decimators 281, 282, 283, the system 200 more efficiently provides the same or similar functionality as the system 100. Such efficiency savings of the system 200 may exceed 20% over the system 100, where the reduced processing at the intermediate frequency provides, at least in part, the savings. By consolidating these functions into the VR-TTD decimator 281, 282, 283, bandwidth of the input signal for each path is reduced earlier in the corresponding path, which enables reduced power consumption and cost for the system as a whole.

Figure 3A:
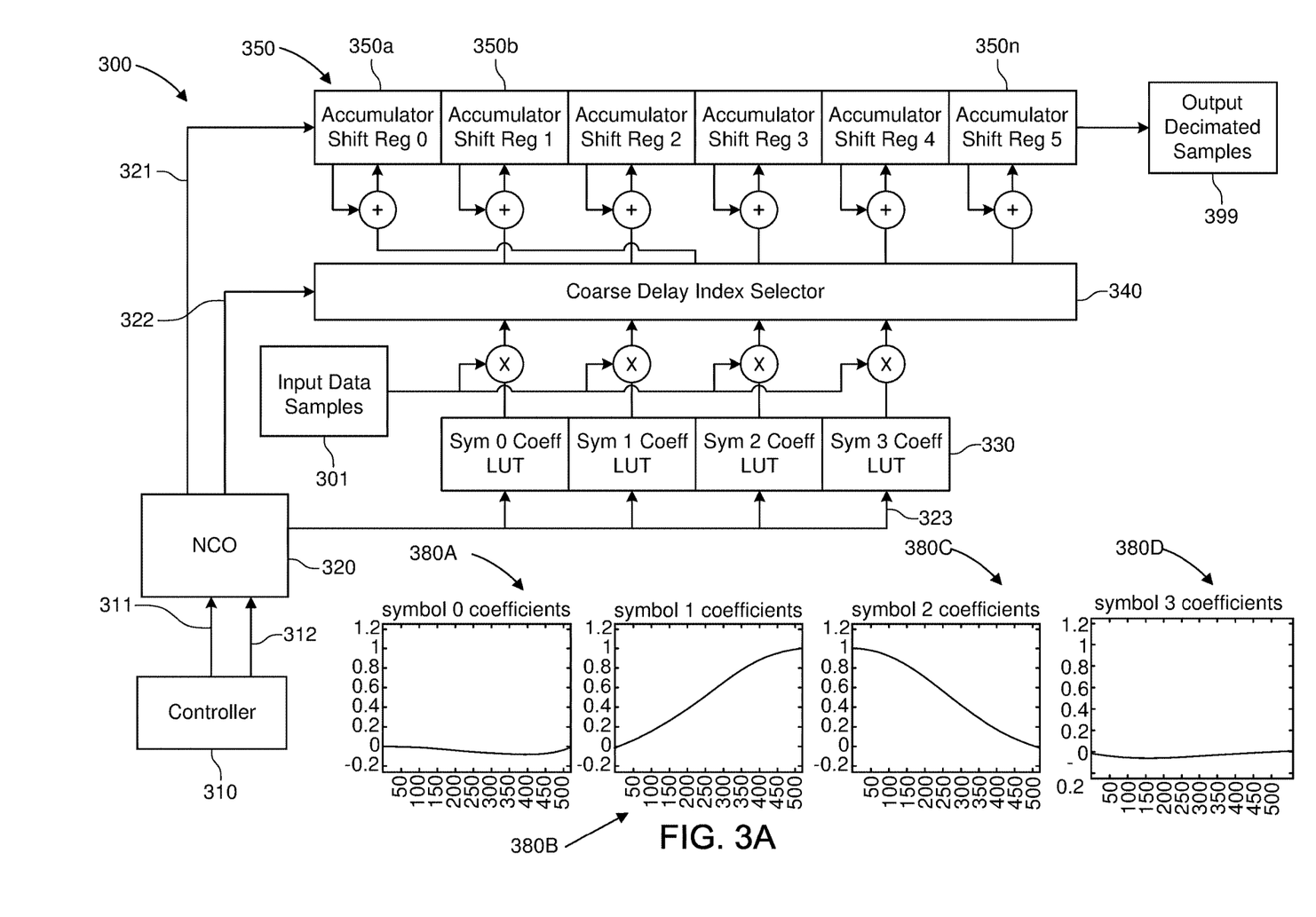
FIG. 3A illustrates variable-rate true-time delay filter, in accordance with example embodiments.

With reference now to FIG. 3A, an example embodiment of a VR-TTD decimator 300 is described in further detail. The VR-TTD decimator 300 may also be called a VR-TTD filter and may correspond to the VR-TTD decimator (281, 282, 283) discussed above with reference to FIG. 2. In an example embodiment, the VR-TTD decimator 300 is a multi-rate decimation filter. In an example embodiment, the VR-TTD decimator 300 is configured to receive a digital input signal from a digital frequency converter (not shown) and provide a decimator output signal to a beamformer (not shown). In an example embodiment, the VR-TTD decimator 300 comprises a VR-TTD decimator input for receiving the input data samples 301 of the digital input signal from the digital frequency converter. As used herein, the data samples 301 comprise the digital input signal. The digital input signal may comprise a first digital I signal and a first digital Q signal, or the digital input signal can be a single input signal. In an example embodiment, the VR-TTD decimator 300 comprises a VR-TTD decimator output for outputting output decimated samples 399 of the decimator output signal, the decimator output signal comprising a first decimated I signal and first decimated Q signal, or the decimator output signal may comprise a single output signal.

In some embodiments, the VR-TTD decimator 300 further comprises a controller 310 configured to perform one or more software processes to generate and provide a control signal to the NCO 320. Stated another way, the controller 310 may be configured to control the filtering of the input data samples 301. In accordance with various example embodiments, the controller 310 forms part of the VR-TTD decimator 300 or is separate from the VR-TTD decimator 300 (in proximity to, or remote from the VR-TTD decimator 300). The controller 310, in an example embodiment, comprises any suitable processor operating a software process to generate and provide a time delay control signal 311 to the NCO 320. The controller 310 may further be configured to generate and provide a desired rate signal 312 to the NCO 320.

The controller 310 may be configured to determine the time delay control signal 311 and the desired rate signal 312 using any suitable algorithms and/or processes that: (1) are based on the relative geometry between the antenna array and the remote source; (2) are based on errors in the signal path (as determined by any suitable calibration routine); (3) are based on time delay errors in the signal path or the like; and/or (4) are configured to control filtering of the input data samples 301.

In one example embodiment, the desired rate for a first set of VR-TTD decimators associated with a first beamformer may be different from the desired rate for a second set of VR-TTD decimators associated with a second beamformer. However, the desired rate may be consistent or the same for the VR-TTD decimators of a single beamformer. In some embodiments, the desired rate corresponds to the decimation rate for the VR-TTD decimator 300.

As introduced above, the VR-TTD decimator 300 may apply coarse and fine delays to filter/decimate the input data samples 301 when generating the output decimated samples 399. In an example embodiment, the VR-TTD decimator 300 comprises a numerically controlled oscillator (NCO) 320 configured to generate a plurality of signals used by various components of the VR-TTD decimator 300. For example, the VR-TTD decimator 300 further comprises an accumulator 350 configured to receive a sample enable signal 321 from the NCO 320, a coarse delay index selector 340 configured to receive a coarse delay signal 322 from the NCO 320, and a look-up-table (LUT) 330 configured to receive an output sample time signal 323 from the NCO 320.

In an example embodiment, the NCO 320 is configured to provide real-time control of the VR-TTD decimator 300. The NCO 320 is configured to coordinate the LUT 330, the coarse delay index selector 340, and the accumulator 350 to affect the overall filtering operation. In an example embodiment, the NCO 320 is configured to receive the desired time delay control signal 311 and/or the desired rate signal 312. The NCO 320 is configured to jointly control the values of the output sample time signal 323, coarse delay signal 322, and sample enable signal 321, in order to enable the overall functionality of the VR-TTD decimator 300, based at least in part on the received desired time delay control signal 311 and/or the desired rate signal 312.

In an example embodiment, the NCO 320 comprises a feedback accumulator (not shown) with overflow detection and associated control logic. The NCO 320 increments at a rate specified by the desired rate signal 312 provided by the controller 310. Each time the NCO 320 overflows or "rolls over", a new output sample is indicated and the NCO 320 is configured to generate the sample enable signal 321, which may also be described as a "flag" or "rollover" signal. The sample enable signal 321 may be provided to the shift registers of the accumulator 350. The sample enable signal 321 may indicate to the accumulator 350 when the accumulator should shift sums present in each register (e.g., Shift Register 0 to Shift Register 1, 1 to 2, 2 to 3, 4 to 5, and 5 to the output decimated signal 399, and so forth).

In an example embodiment, the NCO 320 is configured to receive the time delay control signal and to generate the output sample time signal 323 based on the time delay control signal 311 from the controller 310. The output sample time signal 323 is the 'phase' of the NCO and represents the current fractional time of the output decimated signal 399 relative to the input data samples 301. Thus, the NCO generates the output sample time signal 323 to provide a desired offset between the output decimated signal 399 and the input data samples 301. In an example embodiment, the NCO 320 is a high-resolution NCO suitable for allowing the controller 310 to specify an arbitrary ratio <=1 between the input and output sample rates. For example, FIG. 3A illustrates an example sinc function divided in four parts (380A, 380B, 380C, 380D). The sinc function can be divided into any suitable number of parts, where the greater the number of parts, the more closely the sinc function approximates an ideal filter. In an example embodiment, the sinc function may be an ideal interpolation filter response function. In other embodiments, the sinc function may be modified from the ideal interpolation filter response. The output sample time signal 323 may correspond to a time on the x-axis of each of the sinc function parts (380A, 380B, 380C, 380D), selecting the value of the y-axis for the coefficient at the corresponding x-axis time. The range of the x-axis time for each sinc function can be any suitable amount of time, where an increase in the amount of time is configured to improve the spectral resolution. The output sample time signal 323 is provided to the LUT 330 as an index to the coefficient LUTs, such that the output sample time signal 323 is provided to all the symbol coefficient LUTs (Sym 0 Coeff, Sym 1 Coeff, Sym 2 Coeff, or Sym 3 Coeff) as an index to obtain and output each symbol coefficient from the LUT 330.

In an example embodiment, the VR-TTD decimator 300 comprises the LUT 330, comprising multiple symbol coefficient LUTs (e.g., a symbol 0 coefficient LUT, a symbol 1 coefficient LUT, a symbol 2 coefficient LUT, and a symbol 3 coefficient LUT). Moreover, any suitable number of coefficient LUTs may be used, where a greater number of LUTs provides for greater throughput. In an example embodiment, each symbol coefficient LUT in the LUT 330, stores an oversampled sinc function impulse response of the filter, or a portion thereof. However, in some embodiments, the stored response is a modified response, to suit desired spectral property requirements. The LUT 330 may comprise a vector of read-only memory (ROM) modules, or any other suitable storage medium suitable for ready look up of data. Each module may store a contiguous portion of the oversampled impulse response of the filter. The number of impulse response samples in each LUT may be consistent with the resolution of the output sample time (e.g., x entries). In an example embodiment, the full impulse response is partitioned into multiple blocks to allow the VR-TTD decimator 300 to construct output samples incrementally, through use of accumulator shift registers (described below).

The LUT 330 is configured to output appropriate multiplication coefficients from the respective symbol coefficient LUT's, where the appropriate multiplication coefficients are identified by the output sample time signal 323, as described above. These multiplication coefficients are provided to respective multipliers and multiplied, simultaneously, against the input data samples 301. The results of these multiplications (adjusted input data samples) are provided to the coarse delay index selector 340 such that the "signal" processed by the coarse delay index selector 340 includes any applied fine delay.

In an example embodiment, the coarse delay index selector 340 is configured to provide the output of each multiplier (each an adjusted signal) to selected shift registers of the accumulator 350, as selected by the coarse delay index selector 340. The coarse delay index selector 340 is configured to receive the coarse delay signal 322 and to select which multipliers are connected to which accumulator shift registers based on the coarse delay signal 322.

In an example embodiment, the NCO 320 is configured to receive the time delay control signal 311 and to generate the coarse delay signal 322 based on the time delay control signal 311 from the controller 310. The coarse delay signal 322 may be determined based on a change, over time, of the time delay control signal 311. For example, if the time delay control signal 311 does not change, the coarse delay signal 322 may cause no change in the time delay of the adjusted input data samples. But if the time delay control signal 311 changes, NCO 320 may calculate the magnitude of the change (and possibly the rate of the change) and generate a coarse delay signal 322 to make coarse changes in the amount of delay applied to the adjusted input data samples. In one embodiment, the NCO 320 is configured to account for the entire change in one cycle, and in other embodiments to account for the entire change in time delay over a number of cycles (e.g. 100 or any suitable number of cycles), thus smoothing out the coarse delay response to a time delay control signal 311 change.

In an example embodiment, the accumulator 350 further comprises an array or plurality of accumulator shift registers (e.g. 350a, 350b, ... 350n), with each respective shift register of the array of accumulator shift registers configured to receive respective multiplier output signals (adjusted signals) as directed by the coarse delay index selector 340. Each shift register is configured to accumulate (add) the signals from the respective multiplier output signal (e.g., add the value stored in the shift register with the adjusted signal received from the respective multiplier output signal). The accumulator 350 is further configured to receive the sample enable signal 321 and, based on the sample enable signal 321, to shift the value stored in each register to the next higher register at each NCO 320 rollover. Described another way, each multiplier is configured to output an adjusted signal, that adjusted signal is directed to the appropriate register by the coarse delay index selector (to implement coarse filtering), and that adjusted signal is added to the value already in the respective shift register. Any suitable number of registers may be used. The number of registers (350a to 350n) may be greater than the number of symbol coefficients in the LUT 330.

The joint operation of the accumulator 350 along with the time partitioning of the impulse response in the coefficients LUTs 330 is configured to incrementally accumulate the output decimated signal 399. As the NCO rollover occurs multiple times, each shift register of the accumulator 350 is shifted to the next higher shift register and the final output decimated samples 399 is incrementally created until the entire impulse response has been used.

Thus, in an example embodiment, the output decimated signal incorporates coarse delay, fine delay and decimation of the input signal. Stated another way, the VR-TTD decimator 300 is configured to provide coarse time delay, fine time delay, and filtering through the joint operation of the NCO 320, LUT 330, coarse delay index selector 340, and accumulator 350. In an example embodiment, the variable-rate behavior of the overall filter is enabled based on how fast or slow the NCO phase changes increments, which is itself based on the desired rate signal 312 from controller 310.

In one example embodiment, the time delay value from the controller 310 is a fixed value, and the coarse delay index does not change. But in other example embodiments, the time delay value from the controller 310 varies, and the NCO 320 detects the change in value and adjusts its phase accordingly. In this example embodiment, the NCO phase shift is effectively a time shift because the NCO value represents the output sample time signal 323. In cases where the time delay change is small, the NCO 320 makes an adjustment to the output sample time signal 323 and a corresponding change to the timing of the sample enable signal 321 to the accumulator 350.

In cases where the time delay change is large, the NCO 320 may experience multiple samples' of shift, either multiple overflows or multiple underflows. In this example embodiment, the NCO 320 is configured to reduce transient distortions that appear on the output signal during a time delay change, by adjusting the coarse delay signal 322. For example, when the time delay increases substantially, the coarse delay signal 322 may decrease causing the coarse delay index selector 340 to cause sample accumulation to occur earlier in the shift register chain thereby increasing overall filter delay. In another example, when the time delay decreases substantially, the coarse delay signal 322 may increase causing the coarse delay index selector 340 to cause sample accumulation to be performed later in the shift register chain thereby decreasing overall filter delay. Thus the VR-TTD decimator 300 is configured to handle large jumps in time delay so long as the coarse delay index stays within the bounds of the accumulator shift register.

Thus, in an example embodiment, the output sample enable signal 321, the coarse delay signal 322, and the output sample time values 323 from the NCO 320 are configured to transition jointly so that output signal transients are reduced. In an example embodiment, the VR-TTD decimator 300 is configured to filter without phase shifters. In another example embodiment, the NCO 320 interpolates between delay values over time to automatically smooth out transient effects.

In one example embodiment, the fine-time delay introduced by the VR-TTD decimator 300 is implemented with a high-resolution Look-up-table (LUT). Such an implementation reduces the number of computational resources needed to introduce the fine-time delay, which improves latency and decreases power consumption as compared to the system 100. Furthermore, the compactness reduces transients otherwise caused by time-delay changes. Beyond consolidating the components to reduce transients, the NCO 320 is configured to interpolate between delay values over time to automatically smooth out transient effects. Thus, an example system embodiment comprising a beamformer is configured to gradually adjust path time delays to track moving objects without introducing large transients in the output signal.

A specific concern when dealing with streaming I/Q data can be the transient impact when filter coefficients are updated. In an example embodiment, the VR-TTD decimator 300 comprises a relatively small footprint to cause the transient response due to updates (e.g., when the beam is pointed in a new direction) to be small as compared to larger footprint circuits, such as those of corresponding components in the system 100 (e.g., the coarse delay 120, fine delay 130, filter 140, and decimate 160 blocks). Additionally, by gradually applying a change in time delay over a small number of clock cycles, it is possible to further reduce the transient effect of a change in delay by gradually applying the delay as opposed to applying a delay instantaneously.

Figure 3B:
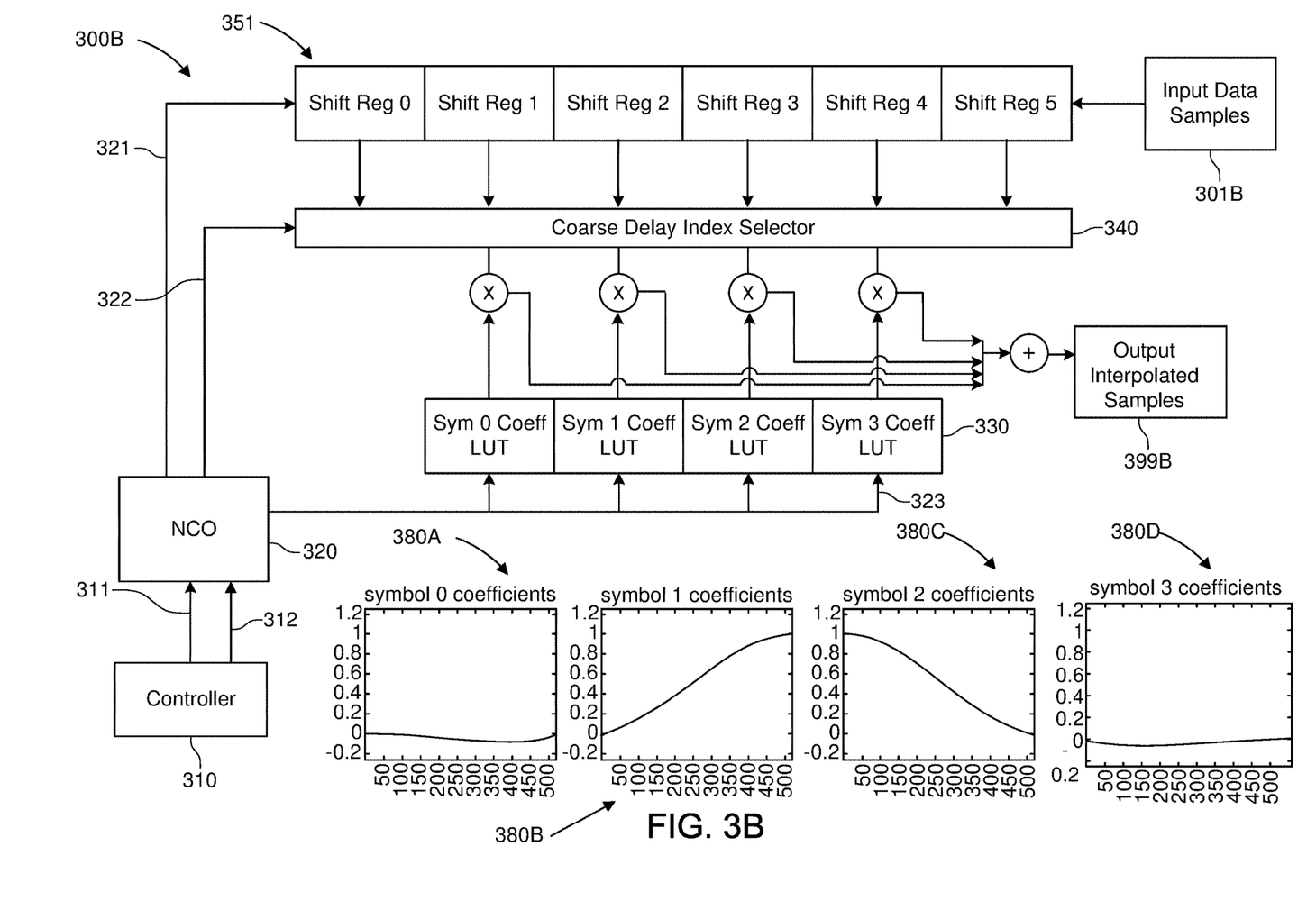
FIG. 3B illustrates another variable-rate true-time delay filter, in accordance with example embodiments.

With brief reference now to FIG. 3B, although FIGS. 2 and 3A are described herein in a receive context, in an example embodiment, the VR-TTD decimator 300 can also be used in the transmit context with slight variation as shown by a VR-TTD decimator 300B. In the transmit context, the general operation follows the discussion of FIG. 3A but in reverse, with the circuit 300B adapted to accommodate resulting mathematical operations. For example, the array of shift registers 351 do not perform accumulation, but rather the outputs of each shift register (populated, for example, with data to be transmitted), of the array of shift registers 351, are multiplied by the respective LUT outputs (Symbol 0 through 3 Coefficients) and are added to generate transmit output interpolated samples 399B to send to the antenna elements. Generally, in an example receive embodiment, the filter is a decimator/downsampler and uses multiple input samples to generate each output sample using accumulation, and in contrast in an example transmit embodiment, the filter is a interpolator/upsampler and generates multiple output samples 399B from each input sample 301B.

Figure 4:
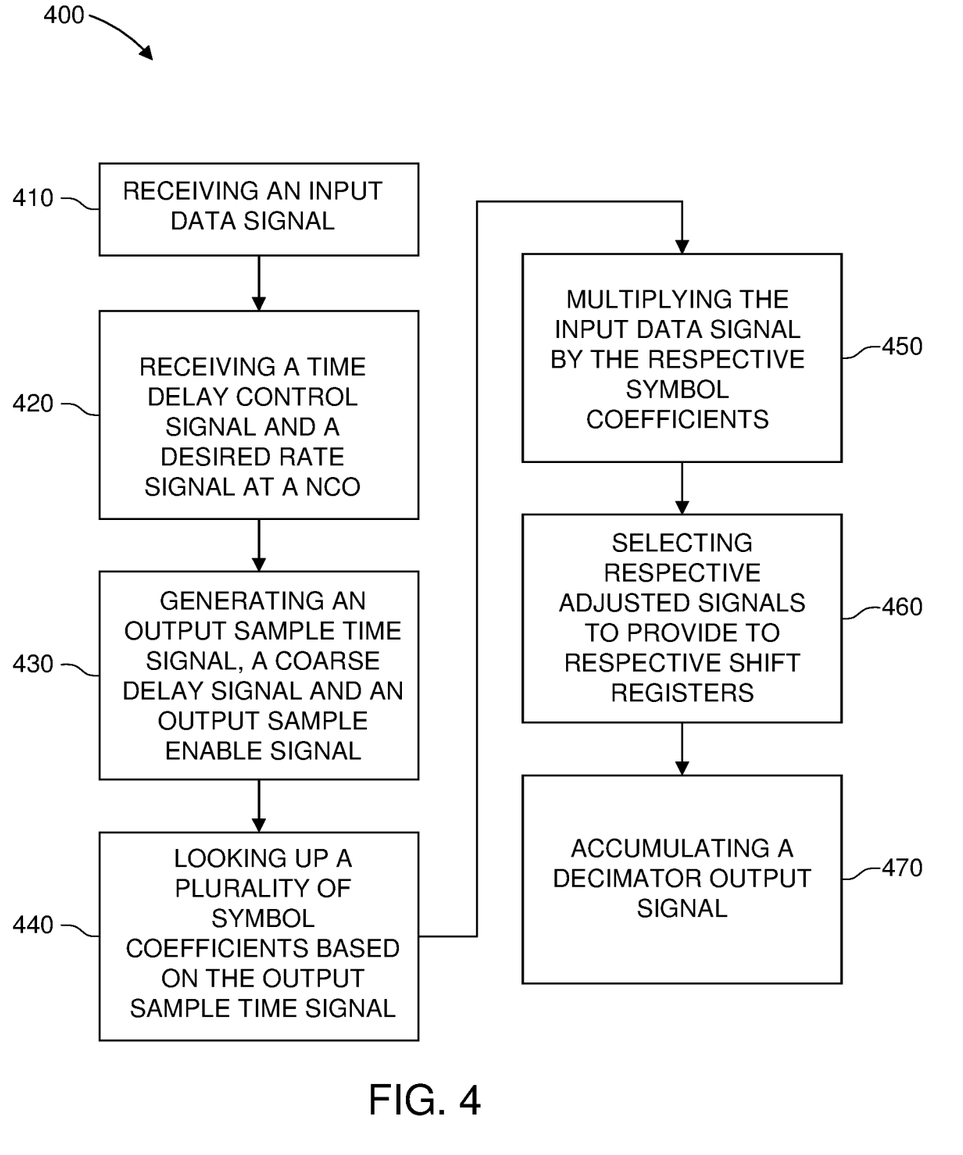
FIG. 4 a method for providing variable-rate true-time delay filtering, in accordance with example embodiments.

In accordance with an example embodiment, and with reference now to FIG. 4, a method 400 of providing variable-rate true-time delay (VR-TTD) filtering/decimating is disclosed. In one example embodiment, the method comprises: (410) receiving input data samples, and (420) receiving a time delay control signal 311 and a desired rate signal 312 at the NCO 320. As discussed above, the time delay control signal 311 and desired rate signal 312 may be provided by a controller 310. The controller 310 may be configured to generate an appropriate time delay control signal 311 and desired rate signal 312 to provide to the NCO 320 for providing VR-TTD filtering to: (1) compensate for delays in the input data signal due to the relative geometrical relationship between the source antenna and a receive antenna element; (2) to compensate for tolerances and errors in the receive or transmit chain; (3) to provide other beam control like tapers or nulls; (4) to perform compensation based on calibration of the antenna elements; and/or (5) to provide for coherent beamforming.

The method 400 may further include (430) generating, at the NCO 320, an output sample time signal 323, a coarse delay signal 322, and an output sample enable signal 321 based on the time delay control signal 311 and/or the desired rate signal 312.

The method 400 may further include (470) accumulating, at an accumulator 350, a decimator output signal 399. For example, adjusted signals may be generated based on the coarse delay signal 322 and output sample time signal 323 and accumulated in appropriate registers of the accumulator and the registers are accumulated into the decimator output signal. 399 The decimator output signal may include fine delay, coarse delay and filtering of the input data samples 301 based on the output sample time signal 323, the coarse delay signal 322, and the output sample enable signal 321 from the NCO 320.

The method 400 may further include: (440) looking up a plurality of symbol coefficients in a look-up-table based on the output sample time signal 323; and (450) multiplying the input data samples 301 by the respective symbol coefficients to generate adjusted signals. A high resolution sinc function (or values generated therefrom) may be stored in the LUT to provide the fine time delay and so that the VR-TTD decimator can accommodate a wide range of bandwidths and decimation rate. The VR-TTD decimator 300 is configured to use the LUT for the sinc function such that no calculations are needed to update filter coefficients as time delays are changed.

The method 400 may further include: (460) selecting, in a coarse delay index selector, respective adjusted signals to provide to respective shift registers of the accumulator based on the coarse delay signal. Thus, in an example embodiment, the coarse time delay is provided by the selection of register samples enabled by the coarse delay index selector.

Method 400 may comprise any suitable combination of all or fewer than all of the aforementioned steps, performed in any suitable order.

In an example embodiment, the VR-TTD decimator 300 is configured for a more efficient utilization of the resources for a fully digital array than a non-VR-TTD decimator. For example, the VR-TTD decimator 300 may be configured to support a trade-off between usable bandwidth, consumed throughput, flatness, and optionally the number of beams. If the filter has a lower usable bandwidth, then the I/Q stream may then operate at a higher rate to make up for the unusable spectrum. In an example embodiment, fully digital arrays are often constrained by the amount of throughput that the backplane can support. Each beam consumes an amount of the throughput limit; the number of beams that can be sent from the array may be a function of the bandwidth of the beam (the beam-bandwidth product).

In one example embodiment, each VR-TTD decimator 300 can be overclocked to make it possible to reuse the same hardware for processing of other signals. For example, if the VR-TTD decimator 300 were overclocked to perform the filtering on signal A in one-half the available time, it could switch to a signal B and perform filtering on that signal B in the remaining time. In an alternate example embodiment, a single VR-TTD decimator 300 can be overclocked and employed in multiple signal paths to make it possible to reuse the same VR-TTD decimator 300 across the multiple signal paths, thereby reducing hardware components and costs in the overall system. For example, if the VR-TTD decimator 300 were overclocked to perform the filtering on a first signal path A in one-half the available time, the same VR-TTD decimator could be switched to a second signal path B and perform filtering on that signal in the remaining time. Thus, the VR-TTD decimator 300 may be overclocked to operate at least twice as quickly as compared to a VR-TTD decimator 300 that is only able to process the first signal or first signal path in the same time duration. In some embodiments, the overclocking of the VR-TTD decimator 300 is not directly related to the desired rate described herein. For example, there may be a distinction between a throughput rate of signal processing in the VR-TTD decimator 300 (e.g., 100e6 samples/second) and the desired rate (0.5=2 input samples per output sample). In some embodiments, the VR-TTD decimator 300 can be overclocked to process the input signal A more quickly than if not overclocked. Thus, overclocking the VR-TTD decimator 300 can enable an increased throughput of the VR-TTD decimator 300 to either (1) process more than one input sample from the same signal per digital clock cycle, or (2) process samples from more than one signal. The discussion herein references employing the VR-TTD decimator to processing one input sample per digital clock cycle, though that not need be the case.

In a further example embodiment, the VR-TTD decimator 300 provides for channel selection within the captured bandwidth. For example, the desired rate signal 312 may be configured to dictate how much the input signal is decimated (e.g., ½, ¼, etc.) for changing the bandwidth that is captured, and the channel selection enables identification of which decimated portion is processed. In an example embodiment, the VR-TTD decimator 300 implemented in this design provides large usable bandwidth.

In an example embodiment, the VR-TTD decimator 300 is implemented in hardware as a parallel re-usable block, where multipliers can be overclocked to use the same filter blocks on multiple beams. As the bandwidth for a beam decreases, the VR-TTD decimator 300 can be overclocked (re-used more often) to support more beams. Alternatively, as the bandwidth for a beam increases, the VR-TTD decimator 300 can be underclocked (used less often) to save power. In an example embodiment, the VR-TTD decimator 300 can be used for tracking a slow target with low transient responses or can be used for hopping between multiple targets where transients are less of a concern. In some embodiments, multiple instances of the system 200 may be used (for example, within a larger overall system) to enable reception of signals from multiple transmitting sources that are uniquely located. For example, with a first system 200 comprising its first digital beamformer 270, signals can be received from one satellite. However, the larger overall system employing ten systems 200 with their ten respective digital beamformers 270, the larger overall system may receive signals from ten satellites and process these signals in parallel. In some embodiments, VR-TTD decimators of these systems 200 (when a number of systems 200 are used in the larger overall system) may be overclocked and shared between systems 200, thereby reducing cost and size of the larger overall system. When multiple digital beamformers exist and share components among themselves, cost and size go down while allowing the larger overall system to serve multiple missions.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "includes," "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A system comprising:
a beamformer for providing an output signal; and
a plurality of paths, wherein each path of the plurality of paths is configured to receive an input data signal from a respective first antenna element of an array of antenna elements, the array of antenna elements configured to receive an RF signal from a remote source, wherein:
each path of the plurality of paths comprises:
a variable-rate true-time delay (VR-TTD) decimator having a VR-TTD decimator input for receiving the respective input data signal, wherein the respective VR-TTD decimator is configured to:
receive, at a respective numerically controlled oscillator (NCO), a respective time delay control signal;
receive, at the respective NCO, a respective desired rate control signal, which is associated with a respective desired signal rate;
control coarse filtering, fine filtering and decimation to control a respective signal sample rate of the respective input data signal; and
generate a respective decimated output signal having a respective output sample rate based on the respective desired rate control signal,
wherein the beamformer is configured to receive the respective decimated output signals from each of the plurality of paths, and to generate the output signal based on the respective decimated output signals; and
wherein the respective decimated output signals each have a variable true-time delay and variable output sample rate that can be adjusted in real-time to enable beamforming at arbitrary sample rates for real-time control of each of the respective VR-TTD decimators based on the variable real-time adjustable respective desired signal rates.

2. The system of claim 1, wherein:
each path further comprises:
an I/Q converter for receiving the respective input data signal and for generating respective I and Q signals; and
a digital frequency converter for receiving the respective I and Q signals, from I/Q converter, and outputting respective digital I and Q signals;
wherein the respective VR-TTD decimator input comprises a respective I signal input for receiving the respective digital I signal and a respective Q signal input for receiving the respective digital Q signal; and
wherein the respective VR-TTD decimator is configured to generate, as the respective decimated output signal, respective decimated I and Q signals based respectively on the respective digital I and Q signals.

3. The system of claim 1, wherein each VR-TTD decimator is a multi-rate decimation filter.

4. The system of claim 1, wherein each VR-TTD decimator further comprises:
the respective NCO for receiving the respective time delay control signal and the respective desired rate control signal, and for providing a respective output sample time signal;
a look-up-table (LUT) for providing a plurality of coefficients based on the respective output sample time signal, wherein the plurality of coefficients are multiplied by the respective input data signal to implement fine time delay and to generate a plurality of respective adjusted signals;
a coarse delay index selector for providing the plurality of adjusted signals based on a coarse delay signal; and
an array of accumulator shift registers for receiving, at respective shift registers of the array of accumulator shift registers, a respective one of the plurality of adjusted signals and accumulating the plurality of adjusted signals to generate the respective decimated output signal.

5. The system of claim 4, wherein the respective VR-TTD decimator further comprises a controller for generating the respective time delay control signal and the respective desired rate control signal.

6. The system of claim 1, wherein the respective input data signal is filtered and decimated in a single respective VR-TTD decimator component that comprises no phase shifters.

7. The system of claim 4, wherein the NCO, the LUT, the coarse delay index selector and the array of accumulator shift registers jointly provide coarse time delay, fine time delay, and filtering in a single respective VR-TTD decimator component.

8. The system of claim 4, wherein the NCO interpolates between delay values over time to automatically smooth out transient effects.

9. The system of claim 4, wherein the look-up-table stores a high resolution sinc function.

10. A variable-rate true-time delay (VR-TTD) decimator for receiving an input data signal and providing an output decimated signal, for real-time control of the VR-TTD decimator based on a variable real-time adjustable desired signal rate, the VR-TTD decimator comprising:
a VR-TTD decimator input for receiving the input data signal; and
a VR-TTD decimator output for outputting the output decimated signal;
a numerically controlled oscillator (NCO) for receiving a time delay control signal and a desired rate control signal and for controlling coarse filtering, fine filtering and decimation of the input data signal based on the time delay control signal and desired rate control signal; and
an accumulator for generating the output decimated signal having a rate based on the desired rate control signal, wherein the accumulator comprises a plurality of shift registers, controlled by the NCO.

11. The VR-TTD decimator of claim 10, wherein the NCO generates an output sample time signal, a coarse delay signal and an output sample enable signal, the VR-TTD decimator further comprising:
a look-up-table for providing a plurality of symbol coefficients based on the output sample time signal, wherein the plurality of symbol coefficients are multiplied by the input data signal to generate respective adjusted signals;

a coarse delay index selector for selecting a respective one of the plurality of shift registers of the accumulator to provide with the respective adjusted signals.

12. The VR-TTD decimator of claim 11, further comprising:
a controller for providing the NCO with the time delay control signal and the desired rate signal, wherein the NCO is configured to generate the output sample time signal based on the time delay control signal.

13. The VR-TTD decimator of claim 10 wherein the VR-TTD decimator is a multi-rate decimation filter.

14. The VR-TTD decimator of claim 10, wherein the VR-TTD decimator is configured to filter without phase shifters.

15. The VR-TTD decimator of claim 11, wherein the look-up-table, the coarse delay index selector, the accumulator and the NCO jointly provide coarse time delay, fine time delay, and filtering.

16. The VR-TTD decimator of claim 10, wherein the numerically controlled oscillator interpolates between delay values, over time, to automatically smooth out transient effects.

17. A method for providing variable-rate true-time delay (VR-TTD) filtering for real-time control of the VR-TTD decimator based on a variable real-time adjustable desired rate control signal, the method comprising:
receiving an input data signal;
receiving a time delay control signal and a desired rate control signal at a numerically controlled oscillator (NCO);
generating, at the NCO, an output sample time signal, a coarse delay signal, and an output sample enable signal; and
accumulating, at an accumulator, a decimator output signal, wherein the decimator output signal includes fine delay, coarse delay and filtering of the input data signal, based on the output sample time signal, the coarse delay signal, and the output sample enable signal from the NCO, wherein the decimator output signal has a rate that is based on the desired rate control signal.

18. The method of claim 17, further comprising:
looking up a plurality of symbol coefficients in a look-up-table (LUT) based on the output sample time signal;
multiplying the input data signal by the respective symbol coefficients to generate respective adjusted signals;
selecting, in a coarse delay index selector, the respective adjusted signals to provide to respective shift registers of the accumulator based on the coarse delay signal;
adding those signals provided to the respective shift registers of the accumulator to the decimator output signal, based on the output sample enable signal.

19. The method of claim 18, further comprising:
generating, in a controller, the time delay control signal; and
generating, in the controller, the desired rate control signal.

* * * * *